United States Patent

[11] 3,578,872

| | | |
|---|---|---|
| [72] | Inventor | Thomas W. McBurnie<br>Santa Barbara, Calif. |
| [21] | Appl. No. | 876,841 |
| [22] | Filed | Nov. 14, 1969 |
| [45] | Patented | May 18, 1971 |
| [73] | Assignee | Air Instruments, Inc.<br>Santa Barbara, Calif. |

[54] SPEED AND TORQUE CONTROL FOR SURGICAL TURBINE
5 Claims, 4 Drawing Figs.

[52] U.S. Cl............................................. 415/25,
32/26, 415/503
[51] Int. Cl............................................. F01b 25/02
[50] Field of Search........................................... 415/44, 25,
503, 13, 26; 32/26, 27

[56] References Cited
UNITED STATES PATENTS

| 1,844,659 | 2/1932 | Horstman..................... | 415/25 |
| 3,423,068 | 1/1969 | Hall............................... | 415/503 |
| 3,472,323 | 10/1969 | Hall............................... | 415/503 |
| 3,477,793 | 11/1969 | Kitagawa....................... | 415/503 |

Primary Examiner—C. J. Husar
Attorney—Lyon & Lyon

ABSTRACT: A turbine-driven rotary tool has a rotary member mounted to turn within a stationary housing, and a rotary torque plate is mounted within the housing. The torque plate has a flange carrying a peripheral rim, and the flange is provided with a series of apertures. An elastomeric ring encircled by the rim acts to close the apertures when the ring is expanded by centrifugal force into contact with the rim, so that maximum speed of the rotary member is limited by flow of motive fluid around the outside of the rim, and whereby maximum torque is determined by flow of motive fluid through the apertures.

PATENTED MAY 18 1971
3,578,872
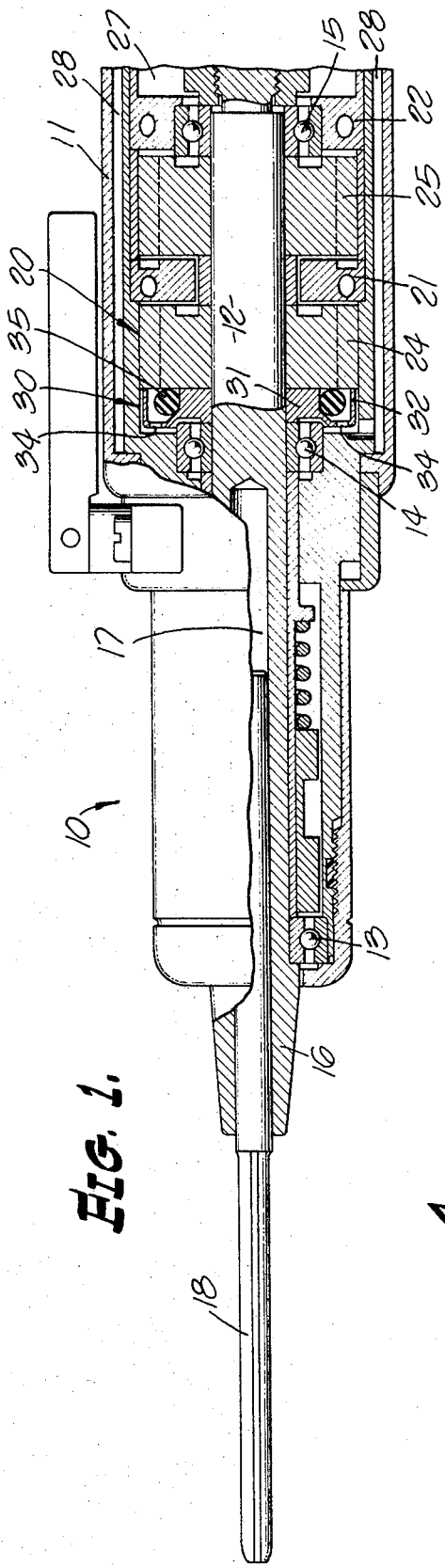
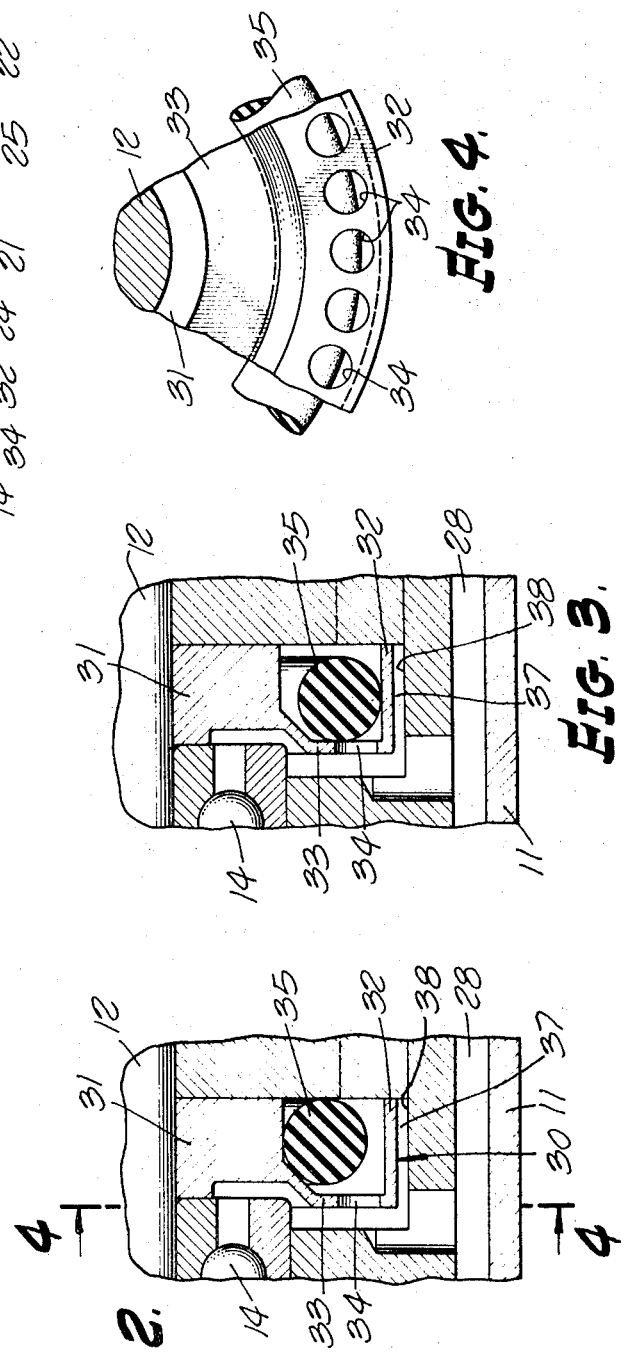
INVENTOR
THOMAS W. McBURNIE
BY Lyon & Lyon
ATTORNEYS

SPEED AND TORQUE CONTROL FOR SURGICAL TURBINE

This invention relates to turbine-powered surgical drills and is particularly directed to improvements for limiting maximum speed and for increasing the torque output, when required.

It is highly desirable that surgical drills be capable of very high r.p.m., for example 100,000 r.p.m., for efficient bone-cutting techniques. However, the free spinning unloaded "runaway" speed must not be so high as to damage the bearings of the device, and this excessive speed is encountered with present day two-stage turbines of high efficiency. Moreover, it is highly desirable to have the surgical drill maintain relatively high speed even when the drill tool is heavily loaded in its contact with the bone, and these conflicting requirements have not been met in present day surgical drills in which the "runaway" speed may be excessive with consequent reduction in bearing life, and the speed of the drill tool may drop off to an unacceptable low value when a heavy load is encountered.

It is a principal object of the present invention to provide a surgical drill assembly in which the stream of motive fluid passing through the fluid motor is automatically throttled to limit the runaway speed, and wherein the throttling action is reduced to provide more torque when the drill tool encounters heavy loads.

Another object is to provide such a device which uses a minimum number of parts and which may readily be embodied in small size high speed surgical drills.

In accordance with this invention, the foregoing objects are achieved by placing a rotary element in the path of the motive fluid which drives the turbine. This element may be placed either upstream or downstream from the turbine, and the element includes a peripheral rim supported by a flange having a series of apertures. An elastomeric O-ring is encircled by the peripheral rim and is adapted to block off flow of motive fluid through the apertures when the ring expands under centrifugal force. The maximum runaway speed is determined by the rate of flow of motive fluid through the small annular space between the periphery of the rim and an encircling bore in the stationary housing of the tool. When the rotary speed tends to drop off as the tool bit encounters heavy loads, the reduction in r.p.m. produces a centrifugal force on the elastomeric ring, with the result that it contracts somewhat to expose at least a portion of the apertures in the flange and thereby increase the rate of flow of motive fluid through the turbine.

In the drawings:

FIG. 1 is a sectional side elevation, partly broken away, showing a preferred embodiment of this invention.

FIG. 2 is a sectional view of a portion of FIG. 1, shown on an enlarged scale, and showing the O-ring in its inoperative position.

FIG. 3 is a view similar to FIG. 2, showing the O-ring in its operative position.

FIG. 4 is a sectional detail taken substantially on the lines 4-4 as shown in FIG. 2.

Referring to the drawings, the surgical drill generally designated 10 includes a stationary housing 11 and a rotary member or spindle 12 mounted to rotate within the housing. Axially spaced bearings 13, 14 and 15 support the spindle 12 for rotation within the housing 11. One end 16 of the spindle 12 projects from the housing 11 and an axial socket 17 in the spindle 12 extends through this projecting portion 16 and is shaped to receive a cutting tool or bit 18. Conventional means, not shown, may be provided for releasably locking the bit 18 in the axial socket 17.

A fluid motor generally designated 20 is provided within the housing 11 for turning the spindle 12 at high speeds. As shown in the drawings, this fluid motor 20 takes the form of a two-stage air turbine having stators 21 and 22 fixed within the housing 11 and having adjacent rotors 24 and 25 mounted to turn with the rotary spindle 12. Passage means are provided in the housing for conveying motive fluid to the fluid motor 20 and for discharging it therefrom. Thus an inlet passage 27 delivers motive fluid to the stators 22 and 21 an the motive fluid then passes through the blades of the rotors 25 and 24 and is discharged through the discharge passage 28. In accordance with this invention, a control assembly 30 is mounted in the passage means within the housing 11 in a position to throttle the flow of motive fluid. While this control assembly 30 could be located either upstream or downstream from the fluid motor 20, it is preferred to place it downstream from the fluid motor adjacent the second stage rotor of the turbine. This control assembly includes an annular element 31 which is fixed to rotate with the spindle 12 and which is provided with a peripheral rim 32 carried on an annular flange 33. The flange is provided with a series of apertures 34. An elastomeric O-ring 35 is encircled by the peripheral rim 32 and this O-ring expands radially under centrifugal force to minimize flow of motive fluid through the apertures 34. An annular passage 37 is provided by the clearance between the outer periphery of the rim 32 and the enclosing bore 38 of the housing 11.

The manually operated control valve for the motive fluid, and the mechanism for applying a braking action to the spindle, are omitted from the drawings since they form no part of the present invention.

When the spindle 12 and the bit 18 spin free without an load on the bit, maximum speed is limited by the amount of motive fluid which passes through the annular passage 37 around the outside of the peripheral rim 32, because the O-ring 35 effectively blocks off flow through the apertures 34 in the flange 33. When the bit 18 encounters a load, causing the spindle to slow down to some extent, the O-ring 35 contracts under the reduced centrifugal force to permit motive fluid to pass through the apertures 34 as well as to continue passing through the restricted annular passage 37. The additional motive fluid produced higher torque through the blades of the turbine rotors 24 and 25 with the result that the bit 18 continues to turn at high speed, even though it encounters resistance in its cutting action against bone material.

I claim:

1. In a turbine driven rotary tool, the combination of: a rotary member rotatably mounted to turn within a stationary housing, passage means in said housing for supplying motive fluid to the turbine and discharging it therefrom, an element within the housing connected to rotate with said member and positioned in said passage means, a portion of said passage means between the ends thereof being divided into two paths, said element having a series of apertures, the proportions of said element and the housing providing a first path for motive fluid between the periphery of said element and the housing, the second path being through said apertures, an elastomeric ring acting to close said apertures when the ring is expanded by centrifugal force, whereby maximum speed of the spindle is determined by flow of motive fluid through said first path, and maximum torque is determined by flow of motive fluid through both paths.

2. In a turbine driven rotary tool, the combination of: a rotary member including a spindle and a bladed turbine mounted to turn within a stationary housing, means at one end of said spindle for driving a drill bit, passage means in said housing for supplying motive fluid to said turbine and discharging it therefrom, a torque plate within the housing connected to rotate with said member and positioned in said passage means, said torque plate having a flange carrying a peripheral rim, the flange having a series of apertures, a portion of said passage means between the ends thereof being divided into two paths, the proportions of the torque plate and the housing providing a first path for motive fluid between the rim and the housing, the second path being through said apertures, an elastomeric ring encircled by said rim and acting to close said apertures when the ring is expanded by centrifugal force into contact with said rim, whereby maximum speed of the spindle is determined by flow of motive fluid through said first path, and maximum torque is determined by flow of motive fluid through both paths.

3. The combination set forth in claim 2 in which the elastomeric ring is circular in cross section.

4. In a turbine driven rotary tool, the combination of: a spindle rotatably mounted within a stationary housing, means at one end of said spindle for driving a drill bit, a bladed turbine connected to drive said spindle, passage means in said housing for supplying motive fluid to said turbine and discharging it therefrom, a torque plate within the housing connected to rotate with said spindle and positioned in said passage means, said torque plate having a flange carrying a peripheral rim, the flange having a series of apertures, a portion of said passage means between the ends thereof being divided into two paths, the proportions of the torque plate and the housing providing a first path for motive fluid between the rim and the housing, the second path being through said apertures, an elastomeric ring encircled by said rim and acting to close said apertures when the ring is expanded by centrifugal force into contact with said rim, whereby maximum speed of the spindle is determined by flow of motive fluid through said first path, and maximum torque is determined by flow of motive fluid through both paths.

5. For use with a turbine driven rotary tool having a rotary member mounted to turn within a stationary housing, the subcombination of a rotary torque plate having a flange carrying a peripheral rim, the flange having a series of apertures, and an elastomeric ring encircled by said rim and acting to close said apertures when the ring is expanded by centrifugal force into contact with said rim.